United States Patent Office.

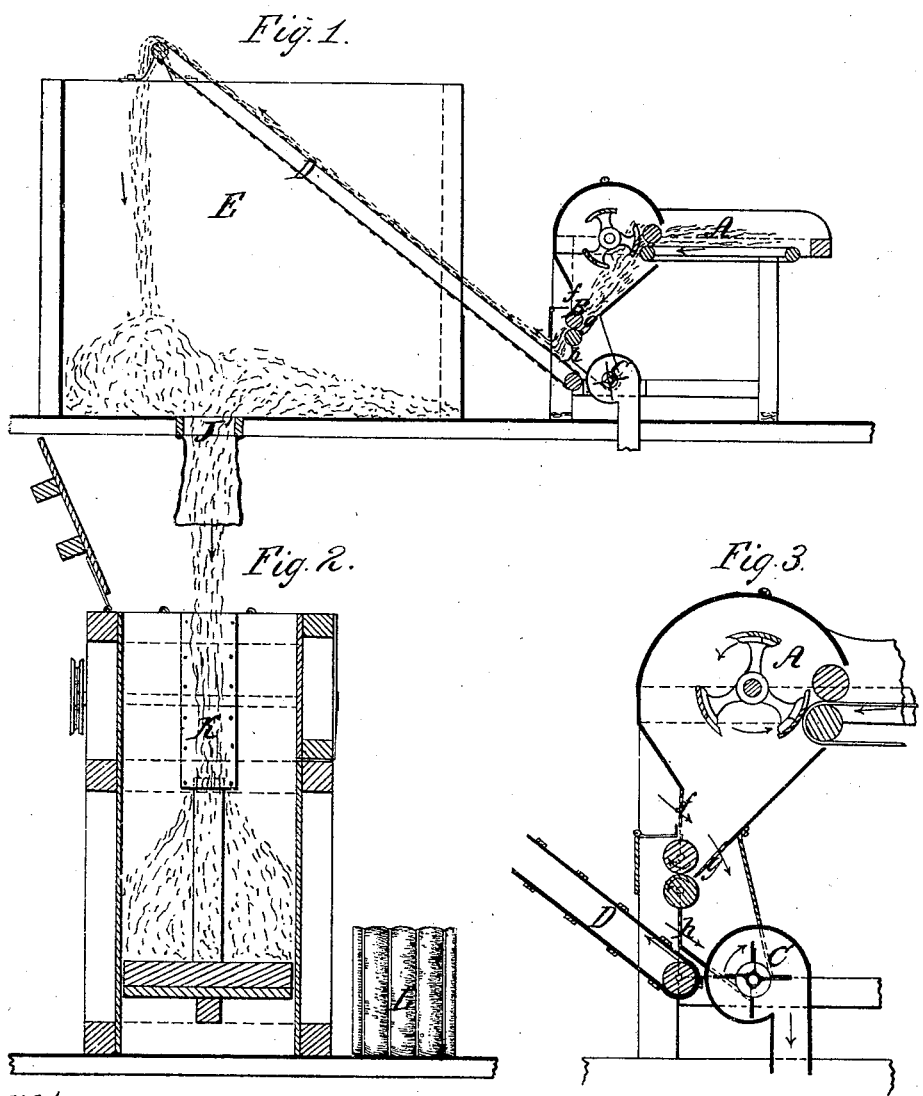

CHARLES BROWN, OF BUFFALO, NEW YORK.

Letters Patent No. 68,345, dated September 3, 1867.

IMPROVEMENT IN PREPARING HAY AND STRAW FOR FEED FOR CATTLE AND HORSES.

*The Schedule referred to in these Letters Patent and making part of the same.*

TO ALL WHOM IT MAY CONCERN:

Be it known that I, CHARLES BROWN, of the city of Buffalo, in the county of Erie, and State of New York, have invented improvements in the Preparation of Hay and Straw as an Article of Food for Cattle and Horses; and I do hereby declare that the following is a full and exact description thereof, sufficient to enable others skilled in the art to which it appertains to practise, apply, and use such improvements.

The nature of this invention relates to the manner or process of preparing hay and straw as an improved article of food for cattle and horses.

The first part of my process is practised as follows:

Cut the hay or straw quite short, say from one-fourth to one and one-half inch in length, with any suitable hay-cutting machine.

Second. For the second part of my process I have a crushing machine placed in close proximity and in such relation to the cutting machine that the cut hay or straw will fall or pass directly from the cutting machine to the crushing machine, and be crushed or flattened in its passage through the machine, and thus made soft and edible.

Third. In the third part of my process the cut and crushed hay is winnowed or subjected to a current of air, for the purpose of removing therefrom such dust, dirt, grit, and foreign matter as may be therein. For this purpose I place and arrange a blower or fan near to the cutting and crushing machines, so as to pass a current of air through and across the column of cut hay as it passes from the cutting to the crushing machine, and also so that a current of air will pass through and across the falling column of cut and crushed hay as it passes from the crushing machine to the elevator. The blower is so arranged as to pass a blast or current of air through the cut hay and also through the crushed hay or straw by a direct blast or by suction. I prefer to so arrange it as to produce the current of air by suction, substantially as represented in the drawings. A wire screen is so placed and used as to prevent the short-cut hay from being carried off by the blast of air, while the dust, dirt, and foreign matter will pass through the screen freely, and thus the cut and crushed hay is winnowed and freed from dust and dirt.

Fourth. In the fourth part of my process I press and bind the short-cut, crushed, and winnowed hay into compact bales for transportation, storage, and commerce.

In the accompanying drawings, I have represented the several machines and their relative arrangement, as used in this process, in order to give a full, clear, and distinct description of my process.

Figure I is a vertical section of the cutting machine, crushing machine, blower, and bin for receiving the crushed hay, and elevator for carrying the crushed hay from the crushing machine to the receiving-bin, in their relative arrangement and combination as used in this process.

A represents the cutting machine, which may be of ordinary construction.

B represents the crushing machine, which consists of two metal rollers revolving towards each other, and worked by appropriate gear. They may be hung in adjustable journal-boxes in the framework of the cutting machine, or in an additional frame joined with the cutting machine, or in proximity therewith.

C represents a fan or blower, located below and slightly in rear of the crushing-rollers. This blower, as a distinct machine, may be of common construction and of any required size, or two may be used instead of one. It may be supported in the frame of the cutting machine or in a separate frame near thereto, as may be preferred.

D is an endless-belt conveyor, which catches the cut, crushed, and winnowed hay or straw as it falls from the crushing machine, and conveys it to the receiving-bin E.

f g h represent a wire screen or screens, so placed and arranged as to allow a current of air to pass through the cut hay or straw as it falls or passes from the cutting to the crushing machine, and also be subjected to a current of air as it passes from the crushing machine to the elevator, so that all the dust, dirt, and foreign matter will be blown out of the cut and crushed hay by being thus subjected to two blasts of air. The screens will prevent the hay from being blown away by the current of air, and at the same time allow a free exit of the dust and dirt.

D represents an endless-belt elevator, having slats across. It is placed on an inclination of about forty-five degrees. Its lower end is placed under the crushing-rollers, so that the crushed hay will drop on to the elevator and be carried up by it and deposited in the receiving-bin E. The short-cut, crushed, and winnowed hay or straw is discharged from this receiving-bin or reservoir through the opening J' into the press K, where it is pressed and bound, according to the fourth and completing part of my process, into compact bales. The press may be of common construction, and worked in a common manner, but, for convenience and adaptation to the work, I prefer an improved press.

A bale, as pressed and bound, ready for handling, transportation, storage, and use, is shown at L.

Figure II represents the press for baling.

Figure III is an enlarged view of the cutting, crushing, and winnowing machines.

It is well known that timothy hay, clover, and other hay is hard and tough in the body of the straw and joints, and, when cut short, makes hard sharp-pointed straws or blades, which are quite difficult for the animal to masticate, and many of these hard, sharp-pointed straws are swallowed by the animal without mastication, and hence corrode, injure, and enfeeble the stomach and digestive organs and produce little or no nourishment. My improvement, in crushing this short-cut hay before it is fed to the animal, entirely avoids these evils, and enables the animal easily to masticate the food, and the whole substance thereof is reduced to nourishment and appropriated by the animal. This food is so easily masticated that the animal's teeth will not be worn away so rapidly as in eating the common article of hay, and its teeth and health and strength will be preserved for a greater number of years if fed upon this prepared article than if fed upon the common article. Ground corn, oats, barley, bran, or middlings, known as "ground feed," is mixed with this prepared hay and straw when fed to the animal. It is well known, also, that hay, as it is ordinarily cured, contains a large percentage of dust, dirt, grit, and foreign matter which is not fit for food, but is injurious to the animal's teeth and health, and is the great cause of lung complaints in horses. My process of winnowing the cut and crushed hay before it is fed to the animal removes from it this dust, dirt, grit, and other foreign matter, and greatly improves it. Horses and cattle will thrive upon this food, thus prepared, when they would be unthrifty and weak if fed upon the common article.

What I claim as my invention, and desire to secure by Letters Patent, is—

Preparing short-cut hay and straw by crushing and winnowing, to produce an improved article of food for attle and horses, substantially as described,

CHARLES BROWN.

Witnesses:
E. B. FORBUSH,
B. H. MUEHLE.